United States Patent
Wu

(10) Patent No.: US 8,594,714 B2
(45) Date of Patent: Nov. 26, 2013

(54) METHOD AND DEVICE FOR PROCESSING MEDIA REQUEST IN MULTIMEDIA COMMUNICATION PROCESS

(75) Inventor: Yajuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1032 days.

(21) Appl. No.: 12/237,545

(22) Filed: Sep. 25, 2008

(65) Prior Publication Data

US 2009/0024730 A1    Jan. 22, 2009

Related U.S. Application Data

(63) Continuation of application No. PCT/CN2007/000533, filed on Feb. 14, 2007.

(30) Foreign Application Priority Data

Mar. 25, 2006    (CN) .......................... 2006 1 0070933

(51) Int. Cl.
    *H04B 7/00*    (2006.01)
(52) U.S. Cl.
    USPC .......... 455/518; 455/519; 455/500; 455/517; 455/514; 455/520; 370/260; 370/250; 370/262; 370/263; 370/310
(58) Field of Classification Search
    USPC .............. 455/518, 519, 500, 517, 514, 515, 455/550.1, 414.1–414.4, 445, 416, 422.1, 455/403, 426.1, 426.2, 412.1, 412.2, 466, 455/520; 370/260, 250, 262, 263, 310
    See application file for complete search history.

(56) References Cited

U.S. PATENT DOCUMENTS

| | | | |
|---|---|---|---|
| 7,593,359 B2 | 9/2009 | Eneroth et al. | |
| 7,738,893 B2 * | 6/2010 | Lim | 455/518 |

(Continued)

FOREIGN PATENT DOCUMENTS

| | | |
|---|---|---|
| CN | 1585522 | 2/2005 |
| CN | 1611086 | 4/2005 |

(Continued)

OTHER PUBLICATIONS

OMA PoC System Description, Draft Version 2.0, Open Mobile Alliance, OMA-TS-PoC-System-Description-V2_0-20060524-D, May 24, 2006, 225 pages.

(Continued)

*Primary Examiner* — Keith Ferguson
(74) *Attorney, Agent, or Firm* — Staas & Halsey LLP

(57) ABSTRACT

A method for processing a media request in a multimedia communication process is provided, including: adjusting, by a multimedia application server, a media request queue according to information contained in a media request message or a media request cancellation message received from a first client; determining all the media requests of which positions in the media request queue are changed due to the adjustment; and sending, to one or more clients corresponding to the media requests of which positions in the media request queue are changed, media request queue position status messages to notify the clients corresponding to the media requests of which positions in the media request queue are changed of updated position status of the media requests. A device for processing a media request in a multimedia communication process is also provided. The demands of various multimedia communication services such as the PoC service can be satisfied well.

10 Claims, 5 Drawing Sheets

(56) References Cited

U.S. PATENT DOCUMENTS

| | | |
|---|---|---|
| 7,899,444 B2 * | 3/2011 | Hans et al. ............... 455/416 |
| 2003/0078064 A1 * | 4/2003 | Chan ....................... 455/514 |
| 2006/0019692 A1 | 1/2006 | Huh et al. |
| 2006/0084455 A1 | 4/2006 | Schwagmann et al. |
| 2007/0133435 A1 * | 6/2007 | Eneroth et al. ........... 370/260 |

FOREIGN PATENT DOCUMENTS

| | | |
|---|---|---|
| CN | 1611086 A | 4/2005 |
| CN | 1819671 A | 8/2006 |
| WO | 2005043944 A1 | 5/2005 |
| WO | WO-2005060501 | 7/2005 |

OTHER PUBLICATIONS

Written Opinion of the International Searching Authority, International Application No. PCT/CN2007/000533, Applicant: Huawei Technologies Co., Ltd., et al., Dated: Jun. 7, 2007, 5 pages.

Chinese Office Action, Chinese Application No. 2006100709333, Applicant: Huawei Technologies Co., Dated: May 9, 2008, 10 pages.

Chinese Office Action, Chinese Application No. 2006100709333, Applicant: Huawei Technologies Co., Dated: Jan. 10, 2009, 11 pages.

European Office Action, European Application No. 07 710 954.4-1244, Applicant: Huawei Technologies Co., Ltd., Dated: Apr. 7, 2011, 7 pages.

* cited by examiner

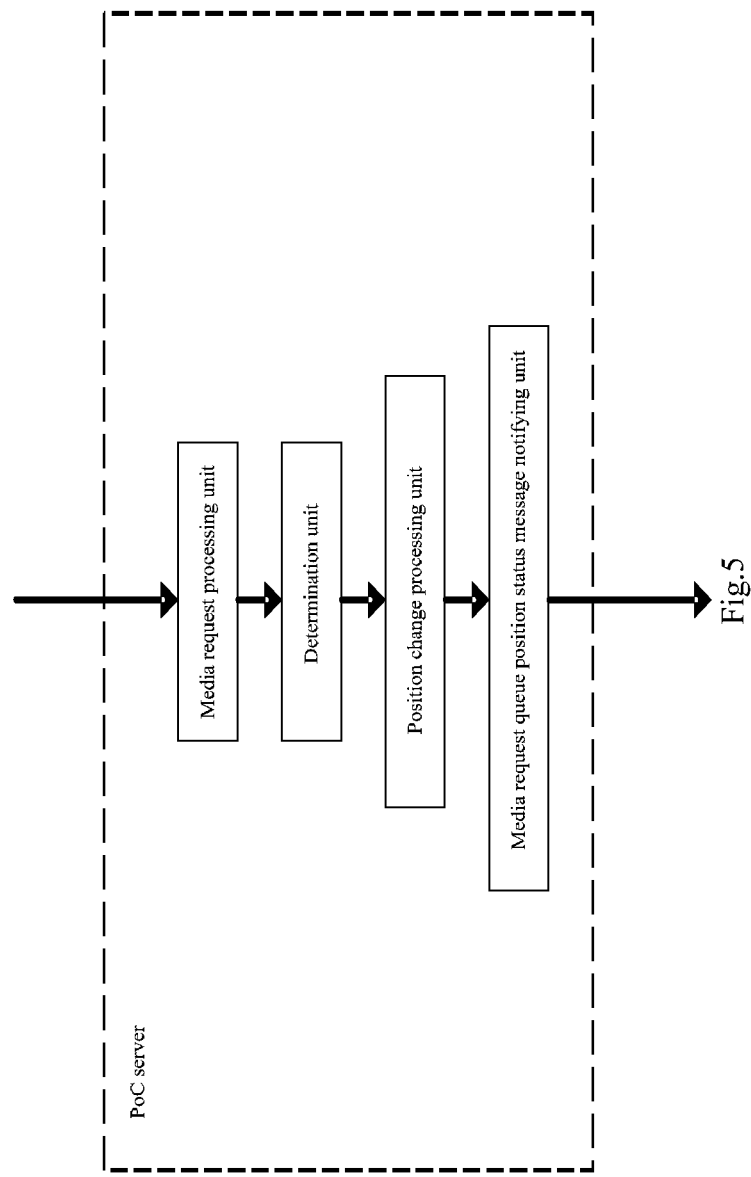

METHOD AND DEVICE FOR PROCESSING MEDIA REQUEST IN MULTIMEDIA COMMUNICATION PROCESS

CROSS REFERENCE TO RELATED APPLICATIONS

The present application is a continuation of International Application No. PCT/CN2007/000533, filed on Feb. 14, 2007, which claims the benefit of Chinese Patent Application No. 200610070933.3, filed on Mar. 25, 2006, both of which are herein incorporated by reference in their entireties.

FIELD OF THE INVENTION

The invention relates to radio communication technologies, and particularly to a technology for processing a media request in a multimedia communication process in a radio communication system.

BACKGROUND OF THE INVENTION

With the fast development of broadband technologies, Push To Talk (PTT) over Cellular (PoC) service emerges in the mobile communication system. The PoC service is a PTT service defined by the Open Mobile Alliance (OMA) to be implemented in a packet network, and the PTT service is a half-duplex communication technology.

The implementation of the PoC service introduces a new communication mode which can not be provided by an existing mobile system or by a conventional voice call system into the mobile communication system. The PoC service can realize real-time call as well as overhead minimization. Meanwhile, because Voice over IP (VoIP) and the half-duplex manner are adopted in the PoC service, the PoC service can satisfy the client experience of real-time communication at a low cost and high efficiency.

The current mode for developing the PoC service defined by the OMA is shown in FIG. 1 and is described below.

First, a client with a PoC capability enabled terminal needs to subscribe with the provider of the PoC service to obtain the authorization of the PoC service.

Second, through the terminal, the PoC client discovers that a network has the PoC service capability.

Third, the PoC client establishes connections to other PoC clients through the provider of the PoC service.

Fourth, the PoC client may push a button and begin to talk, and the PoC service is implemented.

The corresponding PoC network mainly includes a PoC client, a PoC Server, a Session Initiation Protocol/Internet Protocol (SIP/IP) core network, an XML Document Management Server (XDMS), and a Presence Server.

It can be known from the above that the PoC Service is based on the SIP/IP core network and the capability of the SIP/IP core network is used to implement the routing and addressing of clients. The SIP/IP core network may be an IP Multimedia Subsystem (IMS) network or other SIP-based networks.

Some new processing mechanisms such as supporting queuing of media requests are introduced into the PoC service to optimize the performance of the PoC service and improve the experience of clients using the PoC service. The queuing mechanism of media requests may be used to sort multiple media requests in a PoC service session. These media requests can be any message related to media handling and carried by media request control protocols, for example, media request message, media request cancellation message, or media request queue status request message etc. The media request includes Talk Burst Request or Media Burst Request.

Both the PoC client and the PoC server need to support queuing of media requests when the queuing of media requests is implemented.

The processing of the media request queuing function is hereinafter described by taking the Talk Burst Control Protocol (TBCP) as an example. The TBCP serves as the media request control protocol in all the use cases. The implementation using the Media Burst Control Protocol (MBCP) is similar to the TBCP, and it is not described in detail here.

As shown in FIG. 2, the processing specifically includes the following steps:

First, PoC client A pushes the PoC button to request to send a Talk Burst so as to request talking when another client in the PoC session is talking;

Second, PoC client A sends a Talk Burst Request message to a PoC server X performing Controlling Function (CF), and the Talk Burst Request message may contain indication information for identifying the priority level of PoC client A and the service identifier of the PoC group;

Third, the PoC server X performing the CF determines that PoC client B is currently permitted to send a Talk Burst and that the priority level of PoC client A is lower than or equal to the priority level of PoC client B, and the PoC server X inserts the request of PoC client A into a Talk Burst Request queue and sends to PoC client A a Talk Burst Queue Position Status message. The Talk Burst Queue Position Status message may contain the position of the request of PoC client A and the priority level given to the request of PoC client A.

If PoC client A has sent a same request previously and the previous request has been put in the queue, the PoC server removes the previous request and puts the request sent this time into the queue. PoC client A notifies PoC client A that the request sent this time has been put into the queue.

In the above process, if the priority level of PoC client A is higher than the priority level of PoC client C, the request of PoC client A is inserted before the request of PoC client C even if PoC client C is about to talk in the queue. At this point, if the request of PoC client C is at the head of the queue, the PoC server X may send a Talk Burst Queue Position Status message to PoC client C to notify the updated position status of the request of PoC client C, but the PoC server X does not send a Talk Burst Queue Position Status message to the clients after PoC client C in the queue though their positions are also changed.

When the PoC server X sends a Talk Burst position status message to PoC client C because of the change in the position of PoC client C, if there are request messages from other clients such as clients D, E and F after client C in the queue and the clients have obtained the positions of their requests in the queue from the PoC server X in advance, the satisfaction of clients D, E and F decrease due to the insertion of PoC client A. For example, client D thinks that it is his turn to talk after talking of only one client (i.e. talking of client C), but client D finds that he is not permitted to talk actually after one client talks. Further more, the more the requests are inserted before the request of PoC client C, the worse the satisfaction of the clients whose requests are in the queue becomes.

SUMMARY OF THE INVENTION

An embodiment of the present invention provides a method and device for processing media requests in a multimedia communication process so as to enable a communication system to meet the demand for developing the multimedia communication better and thus improve the satisfaction of multimedia clients with the multimedia communication service.

An embodiment of the present invention provides a method for processing media requests in a multimedia communication process, including:
- adjusting, by a multimedia application server, a media request queue according to information contained in a media request message or a media request cancellation message received from a first client;
- determining, by the multimedia application server, all the media requests of which positions in the media request queue are changed due to the adjustment; and
- sending, to one or more clients corresponding to the media requests of which positions in the media request queue are changed, media request queue position status messages to notify the clients corresponding to the media requests of which positions in the media request queue are changed of updated position status of the media requests.

An embodiment of the present invention provides a method for processing a media request in a multimedia communication process, including:
- adjusting, by a multimedia application server, a media request queue according to information contained in a media request message or a media request cancellation message received from a first client;
- determining, by the multimedia application server, media requests of which positions in the media request queue are changed due to the adjustment;
- selecting a media request satisfying a predetermined condition from the media requests of which the positions are changed; and
- sending, to a client corresponding to the media request satisfying the predetermined condition, a media request queue position status message to notify the client of updated position status of the media request of the client in the media request queue.

An embodiment of the present invention provides a device for processing media requests in a multimedia communication process, including a media request processing unit, a position change processing unit, and a position notifying unit, wherein
- the media request processing unit is adapted to insert a media request into a media request queue according to priority information contained in a media request message received, or remove a media request message from the media request queue according to a media request cancellation message received; and
- the position change processing unit is adapted to determine media requests of which positions are changed due to the inserting or removing by the media request processing unit; and notifying, through the position notifying unit, clients corresponding to the media requests of which the positions are changed, or clients corresponding to part of the media requests of which the positions are changed and which satisfy a predetermined condition.

As can be seen from the above technical solutions provided by the embodiments of the present invention, embodiments of the invention can solve the problem in the existing multimedia communication process and thus improve experiences of clients by optimizing and improving the processing scheme for media request queuing in various multimedia communication scenarios. In other words, the present invention can well satisfy the demand of multimedia communication services and thus accelerate the development of the multimedia communication services.

BRIEF DESCRIPTION OF THE DRAWINGS

FIG. 5 is a schematic diagram illustrating a structure of a device in accordance with an embodiment of the present invention.

DETAILED DESCRIPTION OF THE INVENTION

Figure 1:
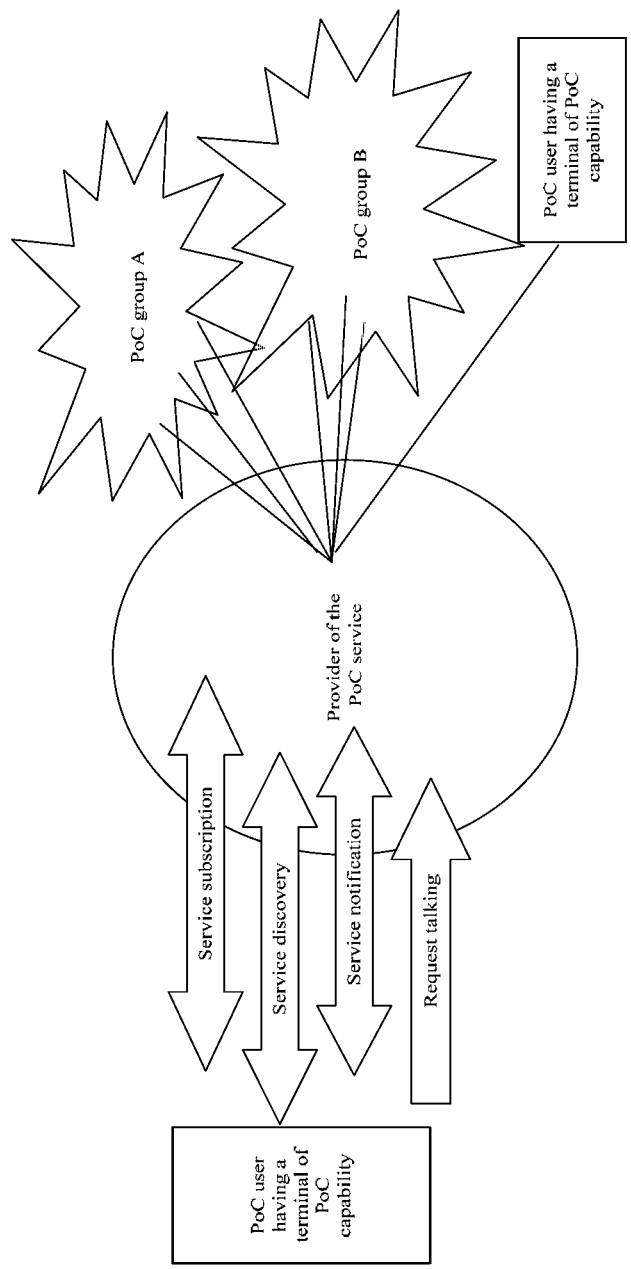
FIG. 1 is a schematic diagram illustrating the conventional implementation of a PoC service in the prior art.

An embodiment of the present invention provides a method for processing a media request in a multimedia communication process, including:
- adjusting, by a multimedia application server, a media request queue, according to information contained in a media request message or media request cancellation message received from a client, where the adjustment may be inserting a media request into the media request queue or removing a media request from the media request queue; and
- determining, by the multimedia application server, all the media requests of which the positions are changed due to the adjustment in the media request queue; and
- sending notifications to clients having sent the media requests respectively to notify them of the current position information of the media requests sent by the clients in the media request queue.

In the method, if the multimedia application server adds a media request received into the media request queue in a position other than the end of the media request queue or if the multimedia application server removes a media request in a position other than the end of the media request queue, the multimedia application server determines all the media requests of which the positions are changed due to the adjustment in the media request queue. The media requests of which the positions are changed include all the media requests in the media request queue after the inserted media request or removed media request.

In this embodiment, the multimedia application server may further determine a media request satisfying a predetermined condition from all the media requests of which the positions are changed, and send, to a client corresponding to the media request satisfying the predetermined condition, a media request queue position status message to notify the client of the position information of the client in the media request queue.

The predetermined condition may be a predetermined number indicating the number of media requests and/or a condition indicating whether the client sending a media request has requested the position status information of the media request. In this case, any of the following manners can be used to determine the media request satisfying the predetermined condition.

In a first manner, a predetermined number of media requests are selected from the media requests of which the positions are changed from head to end to be the media requests satisfying the predetermined condition.

In a second manner, a media request of which the position status information has been requested is selected from the media requests of which the positions are changed as the media request satisfying the predetermined condition.

In a third manner, a predetermined number of media requests are selected from head to end from the media requests of which the positions are changed first, and a media request of which the position status information has ever been requested is selected from the predetermined number of media requests as the media request satisfying the predetermined condition.

In a fourth manner, after a media request queue position request query message sent by a client is received and the position status information about the media request of the client in the media request queue is sent to the client, the media request of the client is marked in the multimedia application server as a media request of which position status information has been requested; media requests of which position status information has been requested are selected from the media requests of which the positions are changed, and a predetermined number of media requests are selected from head to end from the media requests of which position status information has been requested as the media request satisfying the predetermined condition.

The method provided in the above embodiment may be implemented in a PoC server. With the continuous development and evolvement of the PoC service, multiple media control protocols may be adopted in the PoC server. However, all the different media control protocols may apply the media request queue mechanism to optimize the performance of the PoC service. For example, sending a media request message means requesting the right to talk in the TBCP, and means requesting the right to send one or more types of media data in the MBCP; sending a media request cancellation message means cancelling the right to talk requested previously in the TBCP, and means cancelling the right to send one or more types of media data requested previously in the MBCP.

In the embodiments of the present invention, the processing of a media request initiated by the TBCP is the same as that initiated by the MBCP with respect to supporting media request queuing.

Figure 3:
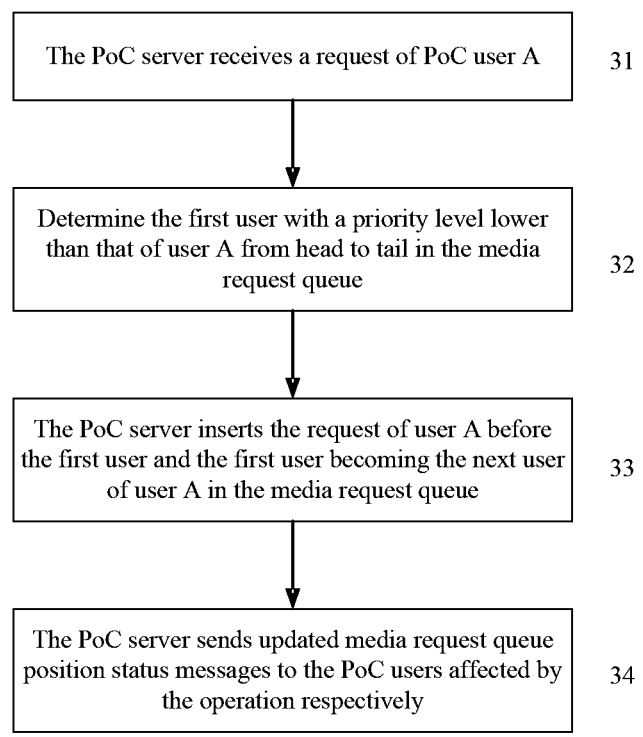
FIG. 3 is a first schematic diagram illustrating the process for performing a PoC service in accordance with an embodiment of the present invention.

The technical scheme in accordance with an embodiment of the present invention is described below by taking that a client sends a media request message and a PoC server receives the media request message as an example. As shown in FIG. 3, the technical scheme in accordance with an embodiment of the present invention is described below.

Block 31: The PoC server receives a request of PoC client A.

Block 32: The PoC server determines all the clients in the current queue with priority levels lower than the priority level of PoC client A and further determines a client in the first position among the determined clients in the media request queue. In other words, the PoC server determines the clients with priority levels lower than that of PoC client A from head to end in the media request queue.

Specifically, the PoC server compares the priority level of client A with the priority levels of the clients in the queue, determines that there is a client with a priority level lower than that of client A in the current queue. The PoC server further determines a client in the first position among the clients with priority levels lower than that of client A. For example, client C is determined as the client in the first position among the clients with priority levels lower than that of client A. Client C may be at the head of the queue or in any position of the queue.

Block 33: The PoC server inserts PoC client A before the client in the first position of the queue among the clients with priority levels lower than that of client A, that is, the client which is previously a client in the first position becomes a client after PoC client A in the queue currently.

In other words, upon receiving the request of PoC client A, the PoC server searches the media request queue, and determines whether there is a client with a priority level lower than that of client A in the current media request queue. If yes, the PoC server inserts the request of client A before the client in the first position of the current queue among the clients with priority levels lower than that of client A. The request of client A cannot be inserted before a client with a priority level higher than that of client A and cannot be inserted before a client with a priority level equal to that of client A according to the principle of First Come First Served on the equivalent condition.

For example, the PoC server traverses the queue from the head, and inserts the request of client A before the request of client M upon finding a first client (i.e. client M) with a priority level lower than that of client A.

For the above example provided in Block 32, the PoC server decides to insert the request of client A before client C (i.e. before the request of client C) upon determining that client C is the client in the first position of the queue among the clients with priority levels lower than that of client A. If client C is at the head of the queue, client A is inserted at the head of the current queue.

Block 34: The PoC server sends updated media request queue position status messages respectively to the PoC clients affected by the operation in Block 33.

In other words, after the operation of insertion in Block 33, the PoC server needs to send the updated media request queue position status messages to the PoC clients affected by the operation if the positions of the media requests in the media request queue are changed.

It should be noted that if client A is inserted into the end of the media request queue, the current status of the media request queue is regarded as not changed because the positions of the media requests of existing clients in the media request queue are not changed except the newly inserted request of client A.

In addition, the objective of Block 34 is to enable the clients of which the positions in the media request queue are changed due to the insertion of client A to obtain the information about their new positions in the media request queue. Thus, in order to perform this Block, the system needs to determine the PoC clients affected by the operation, and sends the corresponding media request queue position status messages to the determined PoC clients respectively. Taking as an example that the request of client A is inserted before client C and client C may be at the head of the media request queue or in the middle of the media request queue, the following manners may be used to implement the process.

In a first manner, the PoC server queries for the clients after client C in the current media request queue, determines the clients after client C as the PoC clients affected by the operation, and sends media request queue position status messages to the PoC clients affected by the operation respectively to notify the PoC clients of information about the current positions and priority levels of the media requests sent by themselves in the media request queue.

In a second manner, based on the first manner above, media request queue position status messages may be sent to only part of the PoC clients affected by the operation, and thus the processing resources of the PoC server may be saved and the experience of clients in performing the PoC service is affected as little as possible.

The second manner may be implemented mainly in some cases that the media request queue is very long, and thus the PoC clients in the backmost positions do not care their specific time to talk very much because there are already many media requests of PoC clients in the media request queue. In those cases, the network performance will be affected if a large number of media request queue position status messages are sent.

Therefore, in order to avoid the affection on the network performance by sending a large number of media request queue position status messages and to ensure at the most possible extent that a client who cares his turn to talk can obtain the information about the position of the client in the media request queue in real time, the first manner is mended into the second manner. Specifically, in the second manner, media request queue position status messages are not sent to all the clients after client C but are sent only to a certain number of clients within a range of a given value from head to end, and no media request queue position status message is sent by the PoC server to the clients out of the range.

The given value may be determined by the provider of the PoC service (e.g. the operator) according to the local policy or be configured in the PoC server in a certain way. The given value may be determined by the provider of the PoC service according to demands or be an engineering used value determined by the client experience.

In a third manner, based on the first manner above, media request queue position status messages may be sent only to the clients which are affected by the operation and have ever requested their position information.

The third manner is implemented mainly taking into consideration that not all the PoC clients in the media request queue send a media request queue position request (such as the Talk Burst queue position request in the TBCP) message to the PoC server. A PoC client sending no media request queue position request message does not know its own current position in the media request queue and does not care the position of the media request sent by itself in the media request queue very much, and such a PoC client may therefore need not be notified of the change of its position status information in the media request queue after client A is inserted.

In other words, once the PoC server receives a media request queue position request message from a PoC client and replies a message of the position of the media request of the PoC client, the PoC server marks the PoC client to indicate that a media request queue position status message has been sent to the PoC client. If an operation of insertion is performed, the PoC server queries for all the clients in the media request queue after client C, selects the PoC clients marked as media request queue position status messages having been sent to them, and sends updated media request queue position status messages to the selected PoC clients.

A fourth manner is implemented by taking the conditions of the second manner and the third manner into account and combining the two manners. Specifically, in the fourth manner, the media request queue position status messages are respectively sent only to the PoC clients which are affected by the operation of insertion as well as within a range and marked as media request queue position status messages having been sent to.

For example, when selecting the PoC clients to which media request queue position status messages have been sent, the PoC server limits the select range to a range set by the PoC server and does not send a media request queue position status message to a PoC client out of the range; or, a PoC server selects a PoC client marked as a media request queue position status message having been sent to within a set range, and sends an updated position status message if a PoC client satisfying the condition is found, while sends no updated position status message if no PoC client satisfying the condition is selected.

Any of the above four manners can be adopted during the process of Block 34 to determine PoC clients of which the positions of the media requests in the media request queue have been changed due to the operation of insertion.

How to process the media requests sent by clients with different priority levels in the media request queue in a PoC service can be solved with the above processing.

Only the processing for a media request message sent by a client, i.e. the processing of inserting a media request into the media request queue, is described in the process provided by the above embodiment of the present invention. However, it should be noted that the processing process when the client sends a media request cancellation message is similar to the above processing process in the embodiment of the present invention. The only difference is that it is due to the removing of a media request that the position of a media request in the media request queue may be changed in the latter case, and the processing of a media request of which the position is changed is exactly the same as that in the above processing.

Embodiments of the present invention are hereinafter described in detail with reference to the accompanying drawings for better understanding of the present invention.

Embodiment 1

Figure 2:
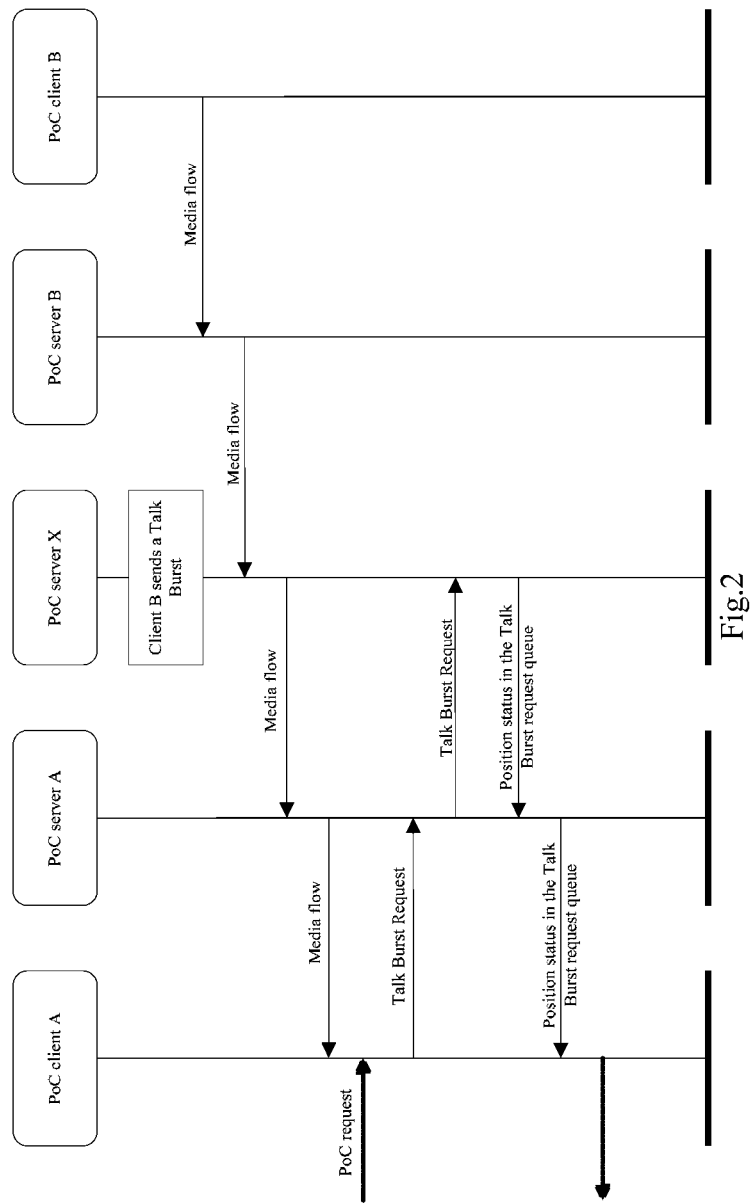
FIG. 2 is a schematic diagram illustrating the conventional process for performing a PoC service in the prior art.

The implementation of an embodiment of the present invention is hereinafter described by supposing that the media control protocol is the TBCP. As shown in FIG. 2, the process is described below.

Firstly, PoC client A presses the PoC button to request sending a Talk Burst when another client is talking in the PoC session.

Secondly, PoC client A sends a Talk Burst Request message to a PoC server X performing the CF, where the Talk Burst Request message may contain a service identifier of the PoC group and indication information for identifying the priority level of PoC client A.

In the above process, PoC client A may also send to the PoC server a media request cancellation message to request removing a media request according to demands of PoC client A. In this case, the PoC server needs to remove the corresponding media request from the media request queue.

No matter a media request message or a media request cancellation message is sent, a media request of which the position is changed may emerge in the media request queue in the PoC server. In this case, a media request of which the position is changed needs to be notified according to the subsequent processing process.

Finally, the PoC server X performing the CF determines that PoC client B is currently permitted to send a Talk Burst and that the priority level of PoC client A is lower than or equal to that of PoC client B, and thus the PoC server X inserts the Talk Burst Request of PoC client A into the Talk Burst Request queue and sends a Talk Burst Queue Position Status message to PoC client A. The Talk Burst Queue Position Status message may include the position of the Talk Burst Request corresponding to PoC client A and the priority level given to the Talk Burst Request.

The improvement of embodiments of the present invention presented in embodiment 1 mainly includes the following.

If the request of PoC client A has a priority level higher than that of a certain PoC client (e.g. client C) and there is no request with a priority level lower than that of client A before client C, the request of PoC client A is inserted before the request of PoC client C; in other words, if the request of PoC client A has a priority level equal to those of some PoC clients in the queue, the request of PoC client A is inserted after the requests of PoC clients with the same priority levels as that of the request of PoC client A and before a first PoC client with a priority level lower than that of the request of PoC client A.

Upon inserting the request of PoC client A into the media request queue, the PoC server X sends Talk Burst Queue Position Status messages to PoC client C and all the PoC clients in the queue after PoC client C to notify both PoC client C and the PoC clients after PoC client C of the corresponding updated position status of the requests respectively.

Embodiment 2

As shown in FIG. 2, this embodiment is described below.

Firstly, PoC client A presses the PoC button to request sending a Talk Burst when another client is talking in the PoC session.

Secondly, PoC client A sends a Talk Burst Request message to PoC server X performing the CF, where the Talk Burst Request message may contain a service identifier of the PoC group and indication information for identifying the priority level of PoC client A.

In the above process, PoC client A may also send to the PoC server a media request cancellation message to request removing a media request according to demands of PoC client A. In this case, the PoC server needs to remove the corresponding media request from the media request queue.

No matter a media request message or a media request cancellation message is sent, a media request of which the position is changed may emerge in the media request queue in the PoC server. In this case, a media request of which the position is changed needs to be notified according to the subsequent processing process.

Finally, PoC server X performing the CF determines that PoC client B is currently permitted to send a Talk Burst and that the priority level of PoC client A is lower than or equal to that of PoC client B, and thus PoC server X inserts the request of PoC client A into the Talk Burst Request queue and sends a Talk Burst Queue Position Status message to PoC client A. The Talk Burst Queue Position Status message may contain the position of the request corresponding to PoC client A and the priority level given to the request.

The corresponding improvement presented in embodiment 2 mainly includes the following.

If the request of PoC client A is given a priority level higher than that of a PoC client (e.g. client C) and there is no request with a priority level lower than that of client A before client C, the request of PoC client A is inserted before the request of PoC client C. In other words, if the request of PoC client A has a priority level equal to those of some PoC clients in the queue, the request of PoC client A is inserted after the requests of PoC clients with the same priority level as that of the request of PoC client A and before a first PoC client with a priority level lower than that of the request of PoC client A.

Upon inserting the request of PoC client A into the media request queue, the PoC server X may send Talk Burst Queue Position Status messages to PoC client C as well as a predetermined number of PoC clients after PoC client C in the queue to notify PoC client C and the predetermined number of PoC clients of the updated position status of their corresponding requests respectively. The value of the predetermined number may be set in the PoC server by the operator according to demands.

Embodiment 3

As shown in FIG. 2, embodiment 3 is specifically described as follows.

Firstly, PoC client A presses the PoC button to request sending a Talk Burst when another client is talking in the PoC session.

Secondly, PoC client A sends a Talk Burst Request message to PoC server X performing the CF, where the Talk Burst Request message may contain a service identifier of the PoC group and indication information for identifying the priority level of PoC client A.

In the above process, PoC client A may also send to the PoC server a media request cancellation message to request removing a media request according to demands of PoC client A. In this case, the PoC server needs to remove the corresponding media request from the media request queue.

No matter a media request message or a media request cancellation message is sent, a media request of which the position is changed may emerge in the media request queue in the PoC server. In this case, a media request of which the position is changed needs to be notified according to the subsequent processing process.

Finally, PoC server X performing the CF determines that PoC client B is currently permitted to send a Talk Burst and that the priority level of PoC client A is lower than or equal to that of PoC client B, and thus PoC server X inserts the request of PoC client A into the Talk Burst Request queue and sends a Talk Burst Queue Position Status message to PoC client A. The Talk Burst Queue Position Status message may contain the position of the request corresponding to PoC client A and the priority level given to the request.

The corresponding improvement presented in embodiment 3 mainly includes the following.

If the request of PoC client A is given a priority level higher than that of a PoC client (e.g. client C) and there is no request with a priority level lower than that of client A before client C, the request of PoC client A is inserted before the request of PoC client C. In other words, if the request of PoC client A has a priority level equal to those of some PoC clients in the queue, the request of PoC client A is inserted after the requests of PoC clients with the same priority level as that of the request of PoC client A and before a first PoC client with a priority level lower than that of the request of PoC client A.

Upon inserting the request of PoC client A into the media request queue, if there is one or more clients among PoC client C and all the PoC clients after PoC client C in the queue have sent a Talk Burst queue position request message to the PoC server X, PoC server X may send Talk Burst Queue Position Status messages to the one or more PoC clients having requested the Talk Burst queue position to notify the one or more PoC clients of the updated position status of the requests corresponding to the one or more PoC clients.

Embodiment 4

As shown in FIG. 2, embodiment 4 is specifically described as follows.

Firstly, PoC client A presses the PoC button to request sending a Talk Burst when another client is talking in the PoC session.

Secondly, PoC client A sends a Talk Burst Request message to PoC server X performing the CF, where the Talk Burst Request message may contain a service identifier of the PoC group and indication information for identifying the priority level of PoC client A.

In the above process, PoC client A may also send to the PoC server a media request cancellation message to request removing a media request according to demands of PoC client A. In this case, the PoC server needs to remove the corresponding media request from the media request queue.

No matter a media request message or a media request cancellation message is sent, a media request of which the position is changed may emerge in the media request queue in the PoC server. In this case, a media request of which the position is changed needs to be notified according to the subsequent processing process.

Finally, PoC server X performing the CF determines that PoC client B is permitted currently to send a Talk Burst and that the priority level of PoC client A is lower than or equal to that of PoC client B, and thus PoC server X inserts the request of PoC client A into the Talk Burst Request queue and sends a Talk Burst Queue Position Status message to PoC client A. The Talk Burst Queue Position Status message may contain the position of the request corresponding to PoC client A and the priority level given to the request.

The corresponding improvement presented in embodiment 4 mainly includes the following.

If the request of PoC client A is given a priority level higher than that of a PoC client (e.g. client C) and there is no request with a priority level lower than that of client A before client C, the request of PoC client A is inserted before the request of PoC client C. In other words, if the request of PoC client A has a priority level equal to those of some PoC clients in the queue, the request of PoC client A is inserted after the requests of PoC clients with the same priority level as that of the request of PoC client A and before a first PoC client with a priority level lower than that of the request of PoC client A.

Upon inserting the request of client A into the media request queue, if there is one or more clients among PoC client C and all the PoC clients after PoC client C in the queue have sent a Talk Burst queue position request message to the PoC server X, PoC server X may send Talk Burst Queue Position Status messages to a predetermined number of PoC clients having requested the Talk Burst queue position to notify the predetermined number of PoC clients of the updated position status of the requests corresponding to the predetermined number of PoC clients respectively. Specifically, this may be implemented with either of the following two manners.

First, according to a predetermined value set by the operator which is a predetermined number of PoC clients having requested the Talk Burst queue position, the PoC server X may only notify PoC client C and the predetermined number of PoC clients having requested the Talk Burst queue position from head to end.

Second, according to a predetermined value set by the operator which is a predetermined number of PoC clients affected by the insertion, the PoC server X may first determine the predetermined number of PoC clients among PoC client C and all the PoC clients after PoC client C, then determine the PoC clients having requested the Talk Burst queue position from the predetermined number of PoC clients, and notify the determined PoC clients of the updated position status of the requests corresponding to the determined PoC clients.

The value of the predetermined number in the above two manners may be an engineering value obtained by experiments or be set by the operator.

Embodiment 5

This embodiment of the present invention is described in detail by supposing that the media control protocol is the MBCP. The following description is given by taking one implementation manner as the example while other implementation manners are similar to this and thus will not be described one by one here.

Figure 4:
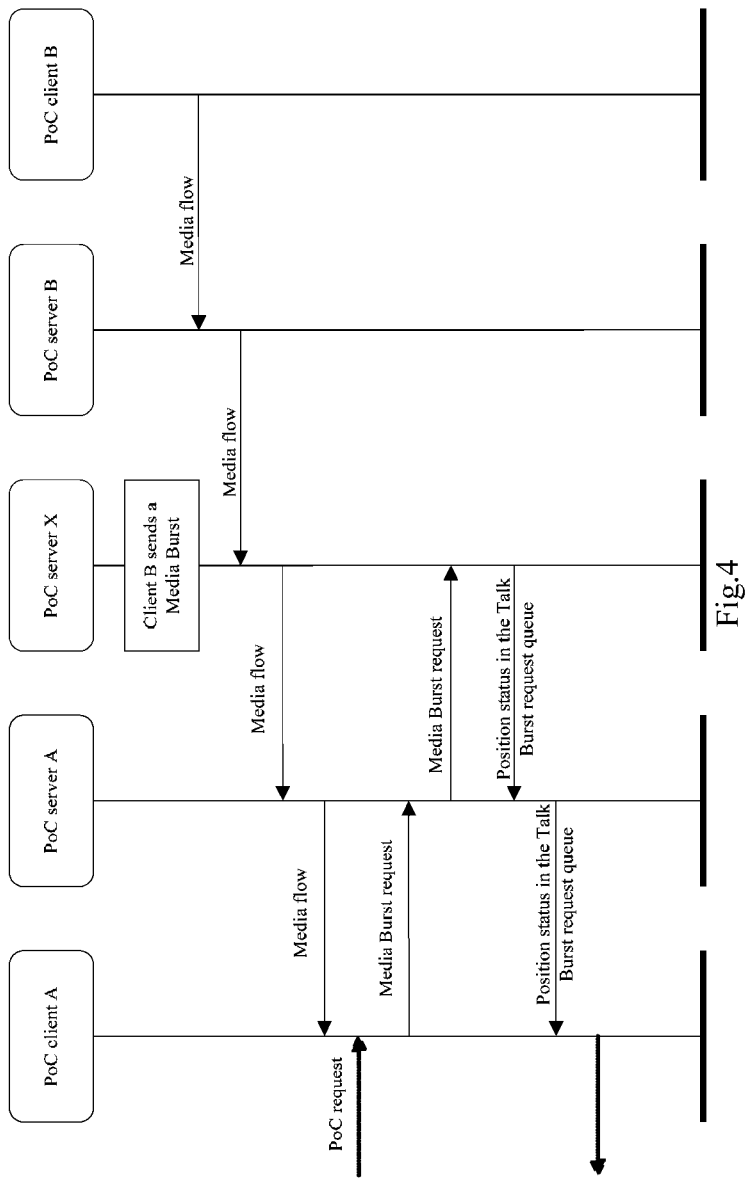
FIG. 4 is a second schematic diagram illustrating the process for performing a PoC service in accordance with an embodiment of the present invention.

As shown in FIG. 4, the detailed processing process in this embodiment is described below.

Firstly, PoC client A presses the PoC button to request sending a Media Burst when another client is sending media data in the PoC session.

Secondly, PoC client A sends a Media Burst Request message to PoC server X performing the CF, where the Media Burst Request message may contain a service identifier of the PoC group and indication information for identifying the priority level of PoC client A.

In the above process, PoC client A may also send to the PoC server a media request cancellation message to request removing a media request according to demands of PoC client A. In this case, the PoC server needs to remove the corresponding media request from the media request queue.

No matter a media request message or a media request cancellation message is sent, a media request of which the position is changed may emerge in the media request queue in the PoC server. In this case, a media request of which the position is changed needs to be notified according to the subsequent processing process.

Finally, PoC server X performing the CF determines that PoC client B is currently permitted to send a Media Burst and that the priority level of PoC client A is lower than or equal to that of PoC client B, and thus PoC server X inserts the request of PoC client A into the Media Burst Request queue and sends a Media Burst queue position status message to PoC client A. The Media Burst queue position status message may contain the position of the request corresponding to PoC client A and the priority level given to the request.

The corresponding improvement presented in embodiment 5 mainly includes the following.

If the request of PoC client A is given a priority level higher than that of a PoC client (e.g. client C) and there is no request with a priority level lower than that of PoC client A before client C, the request of PoC client A is inserted before the request of PoC client C. In other words, if the request of PoC client A has a priority level equal to those of the requests of some PoC clients in the queue, the request of PoC client A is inserted after the requests of PoC clients with the same priority level as that of the request of PoC client A and before a first PoC client with priority level lower than that of the request of the PoC client A.

Upon inserting the request of PoC client A into the media request queue, PoC server X may send Media Burst queue position status messages to PoC client C and all the PoC clients after PoC client C in the queue to notify them of the updated position status of the their corresponding requests respectively.

An embodiment of the present invention also provides a device for processing a media request in a multimedia communication process. As shown in FIG. 5, the device may be set in a multimedia application server (e.g. a PoC server) or be set in other network entities for processing a multimedia service (e.g. the PoC service). The device may include the following units:

a media request processing unit, adapted to insert a media request received into a media request queue according to the priority level information, and remove a media request from the media request queue according to a media request cancellation message received;

a position change processing unit, adapted to determine media requests of which the positions are changed because of inserting or removing by the media request processing unit, and notify, through a position notifying unit, the clients corresponding to all the media requests of which the positions are changed or the clients corresponding to media requests changing in positions and satisfying a predetermined condition; and the position notifying unit, being a media request queue position status message notifying unit in the PoC server, adapted to notify, with a media request queue position status message, a corresponding client of the updated position status information corresponding to a media request of which the position is changed.

The device may further include:

a determination unit, adapted to determine whether there is a media request of which the position is changed when the media request processing unit performs the inserting or removing; trigger the position change processing unit if yes. The determination unit is further adapted to determine whether there is a media request of which the position is changed according to whether the media request inserted into the media request queue or the media request removed from the media request queue is at the end of the queue (i.e. in the last position of the queue); and determine that there is a media request of which the position is changed if the media request inserted into the media request queue or the media request removed from the media request queue is not at the end of the queue To sum up, in the embodiments provided by the present invention, a multimedia application server may notify the clients corresponding to media requests affected by inserting a media request into a queue or by removing a media request from the queue. Therefore, after a media request is inserted in any position of the queue or a media request in the queue is removed, the clients corresponding to media requests of which the positions in the queue are affected by inserting or removing can obtain the update of their positions. In other words, according to the method and device for processing a media request queue in a multimedia communication process provided by the embodiments of the present invention, the processing for a media request queuing of various multimedia service applications is optimized and improved. Correspondingly, the experience of clients is improved, and demands of multimedia services such as the PoC service are well satisfied. The development of multimedia services such as the PoC service is therefore accelerated.

The foregoing is only illustrative embodiments of the present invention. The protection scope of the present invention, however, is not limited to the above description. Any change or substitution, within the technical scope disclosed by the present invention, easily occurring to those skilled in the art, should be covered by the protection scope of the present invention. The protection scope of the present invention should be in accord with claims.

What is claimed is:

1. A method for processing a media request in a multimedia communication process, comprising:

adjusting, by a multimedia application server, a media request queue according to a priority level of a first client contained in a media request message received from the first client or a received media request cancellation message from the first client;

determining, by the multimedia application server, media requests of which positions in the media request queue are changed due to the adjustment;

selecting a media request satisfying a predetermined condition from the media requests of which the positions are changed, the predetermined condition being whether the client has requested position status information about the media request of the client; and sending, to a client corresponding to the media request satisfying the predetermined condition, a media request queue position status message to notify the client of updated position status of the media request of the client in the media request queue.

2. The method of claim 1, wherein the media request is a Media Burst request or a Talk Burst request.

3. The method of claim 2 wherein the adjusting of a media request queue comprises:

inserting, by the multimedia application server, the media request of the first client into the media request queue according to the priority level of the first client upon receiving the media request message from the first client; or removing, by the multimedia application server, the media request of the first client from the media request queue upon receiving the media request cancellation message from the first client.

4. The method of claim 3, wherein the multimedia application server is a Push To Talk (PTT) over Cellular (PoC) server, and the determining of media requests of which positions in the media request queue are changed due to the adjustment is performed by the PoC server if the PoC server inserts the media request of the first client into a position of the media request queue or removes the media request of the first client from a position of the media request queue, wherein the position of the media request queue where the media request of the first client is inserted into or removed from is not the end of the media burst request queue;

wherein the media requests of which positions in the media request queue are changed comprise all media requests after the inserted or removed media request of the first client.

5. The method of claim 2, wherein the selecting of a media request satisfying a predetermined condition from the media requests of which the positions are changed comprises:

selecting media requests of which the position status information have been requested from the media requests of which the positions are changed, and selecting the predetermined number of media requests from head to end from the media requests of which the position status information have been requested as the media request satisfying the predetermined condition.

6. A device for processing a media request in a multimedia communication process, comprising:

a media request processing unit, a position change processing unit, and a position notifying unit, wherein:

the media request processing unit is adapted to insert a media request into a media request queue according to priority information contained in a media request message received, or remove a media request message from the media request queue according to a media request cancellation message received;

the position change processing unit is adapted to determine media requests of which positions are changed due to the inserting or removing by the media request processing unit; and the position notifying unit is adapted to notify clients corresponding to the media requests of which the positions are changed and which satisfy a predetermined condition, wherein the predetermined condition comprises whether the client has requested position status information about the media request of the client.

7. The device of claim 6, wherein the device is set in a Push To Talk (PTT) over Cellular (PoC) server; and the position notifying unit is a media request queue position status message notifying unit in the PoC server, and is adapted to notify, with a media request queue position status message, clients corresponding to the media requests of which the positions are changed and which satisfy a predetermined condition of information about updated position status in the media request queue.

8. The device of claim 7, further comprising a determination unit, adapted to determine whether there are media requests of which the positions are changed when the media request processing unit performs the inserting or removing operation, and trigger the position change processing unit if there are media requests of which the positions are changed.

9. The device of claim 6, further comprising a determination unit, adapted to determine whether there are media requests of which the positions are changed when the media request processing unit performs the inserting or removing operation, and trigger the position change processing unit if there are media requests of which the positions are changed.

10. The device of claim 9, wherein the determination unit is adapted to determine whether there are the media requests of which the positions are changed according to whether the media request inserted into the media request queue or the media request removed from the media request queue is at the end of the media request queue, and determine that there are the media requests of which the positions are changed if the media request inserted into the media request queue or the media request removed from the media request queue is not at the end of the media request.

* * * * *